US011252188B1

(12) United States Patent
Lantuh et al.

(10) Patent No.: US 11,252,188 B1
(45) Date of Patent: Feb. 15, 2022

(54) METHODS AND APPARATUS TO AUTOMATE CYBER DEFENSE DECISION PROCESS AND RESPONSE ACTIONS BY OPERATIONALIZING ADVERSARIAL TECHNIQUE FRAMEWORKS

(71) Applicant: Room40 Labs, Inc., North Charleston, SC (US)

(72) Inventors: Nick Lantuh, Bethesda, MD (US); Michael Jenks, Mount Pleasant, SC (US); Ian Roth, Mount Pleasant, SC (US); Michael Maurer, Mount Pleasant, SC (US); Richard Bowman, Mount Pleasant, SC (US)

(73) Assignee: Room40 Labs, Inc., North Charleston, SC (US)

( * ) Notice: Subject to any disclaimer, the term of this patent is extended or adjusted under 35 U.S.C. 154(b) by 0 days.

(21) Appl. No.: 17/197,737

(22) Filed: Mar. 10, 2021

Related U.S. Application Data

(60) Provisional application No. 63/150,800, filed on Feb. 18, 2021, provisional application No. 63/064,988, filed on Aug. 13, 2020.

(51) Int. Cl.
*H04L 29/06* (2006.01)
*G06N 5/02* (2006.01)
*G06N 3/08* (2006.01)

(52) U.S. Cl.
CPC ......... *H04L 63/1466* (2013.01); *G06N 3/08* (2013.01); *G06N 5/025* (2013.01); *H04L 63/029* (2013.01); *H04L 63/1416* (2013.01); *H04L 63/20* (2013.01)

(58) Field of Classification Search
CPC . H04L 63/1466; H04L 63/20; H04L 63/1416; H04L 63/029; G06N 3/08; G06N 5/025
See application file for complete search history.

(56) References Cited

U.S. PATENT DOCUMENTS 10,574,702 B1 * 2/2020 Rickerd .............. H04L 63/0428
2008/0256619 A1 * 10/2008 Neystadt ............. H04L 63/1416
726/11

(Continued)

OTHER PUBLICATIONS

Arnaldo, I et al., The holy grail of "systems for machine learning." Teaming humans and machine learning for detecting cyber threats. SIGKDD Explorations, vol. 21, Issue 1, Nov. 2019, pp. 39-47.

(Continued)

*Primary Examiner* — Khoi V Le
(74) *Attorney, Agent, or Firm* — Cooley LLP

(57) ABSTRACT

In some embodiments, a method can include identifying detection coverage of a set of adversarial techniques based on telemetry data and a detection instance of an environment. The method can further include determining a subset of detection coverage that has a metric value below a metric value threshold and among the detection coverage for the set of adversarial techniques. The method may further include identifying at least one detection instance associated with the subset of detection coverage. The method can further include presenting, via a graphical user interface, a representation of at least one of the subset of detection coverage or the at least one detection instance associated with the subset of detection coverage. The method can further include updating the subset of detection coverage based on the telemetry data, the detection instance, or the at least one detection instance to improve the metric value.

22 Claims, 12 Drawing Sheets

(56) References Cited

U.S. PATENT DOCUMENTS

| | | | |
|---|---|---|---|
| 2008/0256622 A1* | 10/2008 | Neystadt ............ | H04L 63/1433 |
| | | | 726/14 |
| 2016/0255115 A1 | 9/2016 | Mital et al. | |
| 2018/0367428 A1* | 12/2018 | Di Pietro ............ | H04L 63/1408 |
| 2020/0112590 A1 | 4/2020 | Bhatia et al. | |
| 2020/0177590 A1* | 6/2020 | Levy .................... | H04L 63/104 |
| 2020/0226459 A1* | 7/2020 | Chen ....................... | G06N 3/08 |
| 2020/0252296 A1* | 8/2020 | Iashyn .................... | G06N 3/08 |
| 2020/0285952 A1* | 9/2020 | Liu ......................... | G06N 20/00 |
| 2020/0387833 A1* | 12/2020 | Kursun .............. | H04L 63/1425 |

OTHER PUBLICATIONS

Partial European Search Report for European Application No. 21189809.3, dated Dec. 22, 2021, 15 pages.

Zimmerman, C., "Ten strategies of a world-class cybersecurity operations center," The MITRE Corporation, Dec. 2014, 346 pages.

\* cited by examiner

Examples of Categories, Subcategory, Primitives and Identifiers

| Category | Subcategory | Primitive | Identifier |
|---|---|---|---|
| File | file context | driver loaded None | Microsoft-Windows-Sysmon/Operational Code 6 |
| File | file creation | process created file | Microsoft-Windows-Sysmon/Operational Code 11 |
| File | file deletion | process deleted file | Microsoft-Windows-Sysmon/Operational Code 23 |
| File | file deletion | process deleted file | Windows Security EventID 4660 |
| File | file deletion | user deleted file | Microsoft-Windows-Sysmon/Operational Code 23 |

FIG. 12

METHODS AND APPARATUS TO AUTOMATE CYBER DEFENSE DECISION PROCESS AND RESPONSE ACTIONS BY OPERATIONALIZING ADVERSARIAL TECHNIQUE FRAMEWORKS

CROSS REFERENCE TO RELATED APPLICATION

This application claims priority to and the benefit of U.S. Patent Application No. 63/064,988, filed Aug. 13, 2020 and titled "METHODS AND APPARATUS TO AUTOMATE CYBER DEFENSE DECISION PROCESS AND RESPONSE ACTIONS BY OPERATIONALIZING ADVERSARIAL TECHNIQUE FRAMEWORKS" and U.S. Patent Application No. 63/150,800, filed Feb. 18, 2021 and titled "METHODS AND APPARATUS TO AUTOMATE CYBER DEFENSE DECISION PROCESS AND RESPONSE ACTIONS BY OPERATIONALIZING ADVERSARIAL TECHNIQUE FRAMEWORKS," each of which is incorporated herein by reference in its entirety.

TECHNICAL FIELD

The present application generally relates to the field of information security, and in particular to methods and apparatus for a vendor-agnostic software-defined meta-framework(s) to automate cyber defense decisions by operationalizing adversarial technique frameworks.

BACKGROUND

Known compute devices and applications for cyber defense can have incentives to keep proprietary detection logic that is used by their respective cyber defense platforms. By keeping detection logic hidden from competitors, compute devices and applications for cyber defense maintain a competitive edge over rival cyber defense compute device and software vendors. An unfortunate side effect of the competitive cyber defense compute device sales environment is that organizations, in some instances, can miss true cyber threat risk posture and can be left to blindly trust that the cyber defense compute device vendors will defend them against a broad range of cyber adversary tactics, techniques, and procedures (TTPs).

Furthermore, due to the competitive cyber defense compute device sales environment, organizations often do not understand the relationships between their cyber-related telemetry detections and tools. Without a clear understanding of these relationships, organizations often cannot create an accurate actionable threat model to use as a basis for their cyber-defense decision-making process, which could otherwise include, for instance, the ability to prescribe proper training to bolster identified workforce knowledge gaps, make informed cyber tool procurement decisions based on true needs, perform confident stack consolidation through confirmed cyber defense capability overlap, prioritize detection engineering efforts and mitigations, telemetry health concerns and implement cost efficient storage strategies through confirmed telemetry overlap. Moreover, organizations are challenged to respond to cyber threats at machine speed in near real time because they do not have a basis from which to accurately measure. Therefore, a need exists for apparatuses and methods for supporting cyber defense decisions automatically at machine speed.

SUMMARY

In some embodiments, a method can include identifying detection coverage of a set of adversarial techniques based on telemetry data and a detection instance of an environment. The method can further include determining a subset of detection coverage that has a metric value below a metric value threshold and among the detection coverage for the set of adversarial techniques. The method may further include identifying at least one detection instance associated with the subset of detection coverage. The method can further include presenting, via a graphical user interface, a representation of at least one of the subset of detection coverage or the at least one detection instance associated with the subset of detection coverage. The method can further include updating the subset of detection coverage based on the telemetry data, the detection instance, or the at least one detection instance to improve the metric value to above the metric value threshold.

BRIEF DESCRIPTION OF THE DRAWINGS

FIG. 12 shows a table with examples of categories, subcategories, primitives and identifiers.

DETAILED DESCRIPTION

Figure 1:
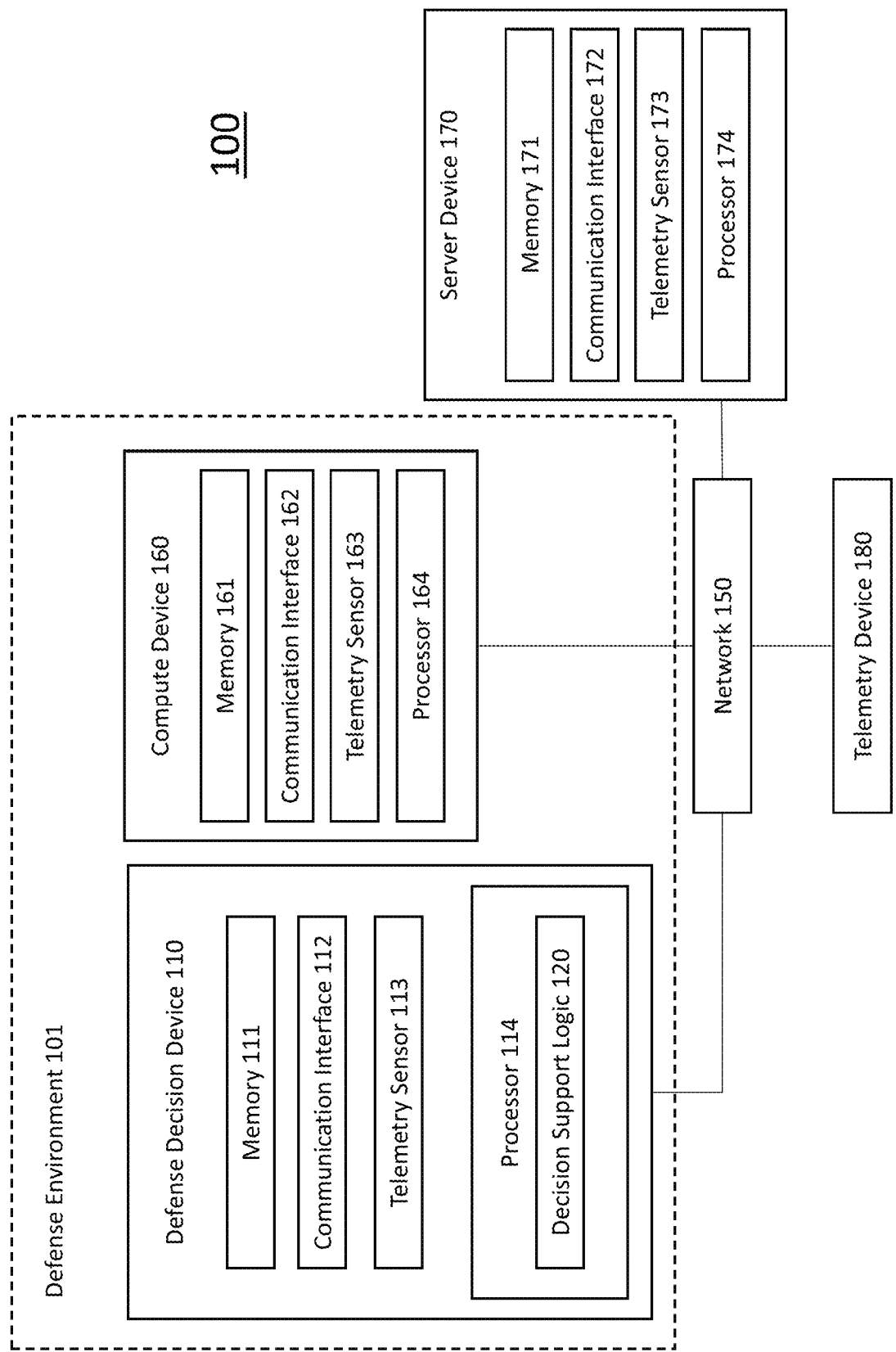
FIG. 1 is a schematic block diagram of a defense decision system, according to an embodiment.

Non-limiting examples of various aspects and variations of the embodiments are described herein and illustrated in the accompanying drawings.

Described herein are defense decision systems that are suitable for fast and reliable cyber defense decisions. The defense decision systems described herein can be used to help organization make cyber defense decisions based on a variety of adversarial technique frameworks. One or more defense decision systems described herein can operationalize one or more adversarial technique frameworks (e.g., MITRE Adversarial Tactics, Techniques, and Common Knowledge (ATT&CK®) Framework) by technically implementing a meta-framework to automate defense decision and response actions. The meta-framework can be defined as a higher order framework that applies to one or more adversarial technique frameworks (also referred to herein as "sub-frameworks" when discussed relative to a meta-framework). In some embodiments, the meta-framework can be directly applied to and use existing adversarial technique frameworks such as, for example, MITRE ATT&CK®, effectively using each existing adversarial technique framework as a sub-framework to the meta-framework. Therefore, the one or more defense decision systems described herein can automate various cyber defense decisions, support actions, and/or remedial actions in a technical fashion and at machine speed.

While, in some embodiments, the methods and apparatus are described herein based on the MITRE ATT&CK® Framework, various other adversarial technique frameworks have been created to document the tactics, techniques, and procedures used by cyber adversaries to compromise their target's information technology (IT) infrastructure. Some examples of the adversarial technique frameworks are the National Security Agency/Central Security Service Technical Cyber Threat Framework (NTCTF), the MITRE ATT&CK® framework, Lockheed Martin Cyber Kill Chain, and/or the like.

One or more embodiments described herein generally relate to apparatus, methods, and systems for dynamically storing, communicating, and/or processing structured and semi-structured data, and in particular, apparatus, methods, and systems that support cyber defense decisions based on the structured and the semi-structured data. In some embodiments, cyber defense decisions can be used to process, for example, stationary data, non-stationary-data, time series, linear data, non-linear data, periodic data, chaotic data, univariate data, multivariate data, and/or the like.

While the methods and apparatus are described herein as communicating and/or processing data from a set of files, a set of executable files, a set of tables, a set of documents, a set of databases, and/or the like, in some instances a defense decision support device can be used to generate the set of files, the set of executable files, the set of tables, the set of documents, the set of databases, and/or the like. Therefore, the user compute device can be used to process and/or generate any collection or stream of data, events, and/or objects. As an example, the user compute device can process and/or generate any string(s), number(s), image(s), video(s), executable file(s), dataset(s), Uniform Resource Locator (URL), global positioning system (GPS) coordinates, name(s), address(es), telephone number(s), email address(es), and/or the like. For further examples, the user compute device can be used to execute or process an application programming interface (API), a function(s) of a software code(s), a webpage(s), a data file(s), a data stream(s), a model file(s), a source file(s), a script(s), a table(s) in a database system, a document-processing macro(s), an e-mail message(s), a text message(s), and/or the like.

FIG. 1 is a schematic block diagram of a defense decision system 100, according to an embodiment. The defense decision system 100 can facilitate storage, communication, and/or analysis of defensive cyber capability within a defended environment including techniques, detection validations (also referred to as 'validation instances'), detections (also referred to as 'detection instances'), telemetry data, mitigations, groups, software/malware, and/or the like. The defense decision system 100 includes a defense decision device 110, a compute device 160, a server device 170, and a telemetry device 180. The defense decision device 110 can be operatively coupled to the compute device 160, the server device 170, and/or the telemetry device 180 via a network 150. The defense decision device 110 can include a hardware-based computing device(s) (e.g., a desktop computer, a laptop, and/or the like), a multimedia device(s) (e.g., a display, a smartphone, a tablet, a wearable device, and/or the like), and/or servers (e.g., high performance computing, high performance storage devices, high performance communication devices, and/or the like) that store, communicate, process, and/or display data. The defense decision device 110 can respond to cyber threats and changes to a defensive posture of an organization's defense environment 101 automatically and at machine speed.

As shown in FIG. 1, the defense environment 101 can include the defense decision system 110 and the compute device 160. The defense decision device 110 can be operatively coupled to the compute device 160 to respond to cyber threats and changes to the defense posture of both the compute device 160 and the defense decision device 110. In some implementations, the defense environment 101 can include only the defense decision device 110. In such implementations, the defense decision device 110 can respond to cyber threats and changes to the defense posture of the defense decision device 110. In some implementations, the defense environment 101 can include only the compute device 160. In such implementations, the defense decision device 110 can respond to cyber threats and changes to the defense posture of the compute device 160.

The compute device 160 can include a compute device(s) operatively coupled to the defense decision device 110 and can transmit and/or receive data and/or analytical models, to/from the defense decision device 110. The compute device 160 can include, for example, a personal computer(s), a laptop(s), a smartphone(s), and/or so forth. The compute device 160 includes a memory 161, a communication interface 162 and a processor 163, which can be structurally and/or functionally similar to the memory 111, the communication interface 112, and/or the processor 114, respectively.

The server device 170 can include a compute device(s) particularly for data storage, communication, and/or processing, and can include, for example, a network of electronic memories, a network of magnetic memories, a server(s), a blade server(s), a storage area network(s), a network attached storage(s), deep learning computing servers, deep learning storage servers, and/or the like. The server 170 includes a memory 171, a communication interface 172 and a processor 173, which can be structurally and/or functionally similar to the memory 111, the communication interface 112, and/or the processor 114, respectively. In some embodiments, the database 170 can include and/or execute a cloud-based service such as, for example, a software as a service (SaaS), a platform as a service (PaaS), an infrastructure as a service (IaaS), and/or the like.

The telemetry device 180 can include a data source that provides telemetry data. In some instances, the telemetry device 180 can be/include a security appliance(s), a data lake(s), a device(s) with security information and event management (SIEM) software, and a device(s) with endpoint detection and response (EDR) technology, and/or the like. The telemetry device 180 can include a memory (not shown) that stores the telemetry data, a processor (not shown) that processes the telemetry data, and a communication interface (not shown) that receive/transmits the telemetry data to another device(s) such as defense decision device 110.

Telemetry data includes, for example raw log data that can be used to detect adversarial techniques used by cyber adversaries. The defense environment 101 can possess a combination of an identifier (e.g. Microsoft-Windows-Sysmon/Operational Event ID 6), a primitive (e.g., driver loaded none), a subcategory (e.g., file context), and/or a category (e.g., file), to detect a use of an adversarial technique outlined on MITRE ATT&CK.

The network 150 can be a digital telecommunication network of servers and/or compute devices. The servers and/or computes device on the network 150 can be connected via a set of wired or wireless communication networks (not shown) to share resources such as, for example, data storage and/or computing power. The wired or wireless communication networks between servers and/or compute devices of the network 150 can include a set of communication channels, for example, a radio frequency (RF) communication channel(s), a fiber optic commination channel(s), an electronic communication channel(s), a satellite communication channel(s), and/or the like. The network 150 can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

The defense decision device 110 includes a memory 111, a communication interface 112, a telemetry sensor 113, and a processor 114. The defense decision device 110 can further include a user interface (not shown) to display information (e.g., a detection instance, a subset of detection coverage) and/or receive commands (e.g., to enable a detection logic) to/from a user of the defense decision device 110. The user interface can include, for example, a touch screen(s), a monitor, a projector, a mouse(s), a keyboard(s), a keypad(s), a stylus pen(s), and/or the like. The defense decision device 110 can receive, via the network 150, data such as, for example, the techniques, the validation instances, the detection instances, the telemetry data, the mitigations, the groups, the software/malware, and/or the like from a set of data source, using the communication interface 112. The set of data sources can include, for example, the compute device 160 and/or the database 170. In some instances, the data can be stored in the memory 111 of the defense decision device 110.

The memory 111 of the defense decision device 110 can be, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like. The memory 111 can store, for example, one or more software modules and/or code that includes instructions to cause the processor 114 to perform one or more processes or functions (e.g., the decision support logic 120).

The memory 111 can store a set of files associated with (e.g., generated by executing) the decision support logic 120. The set of files can include data generated by the decision support logic 120 during the operation of the defense decision device 110. For example, the set of files can include telemetry data, decision logic instances, temporary variables, return memory addresses, and/or the like, generated during the operation of the defense decision system 110.

The communication interface 112 of the defense decision device 110 can be a hardware component of the defense decision device 110 to facilitate data communication between the defense decision device 110 and external devices (e.g., the compute device 160, the server device 170), internal components of the user compute device 110 (e.g., the processor 114, the memory 111, etc.), and/or peripheral devices (not shown; e.g., a scanner(s), an external hard drive(s), and/or the like) operatively coupled to the defense decision system 110. The communication interface 112 can include, for example, a network interface card (NIC), a Wi-Fi™ board, a Bluetooth® board, an optical communication board, a universal serial bus (USB) board, and/or any other suitable wired and/or wireless communication interface. In some implementations, the communication interface 112 can be configured to connect the defense decision device 110 to the network 150. In some instances, the defense decision device 110 can facilitate receiving or transmitting the data via the network 150. More specifically, in some instances, the communication interface 112 can facilitate receiving/transmitting data through the network 150 from/to the compute device 160 and/or the server device 170, once each is operatively coupled to the defense decision device 110 via network 150. In some instances, data received via the communication interface 112 can be processed by the processor 114 and/or stored in the memory 111, as described in further detail herein.

The telemetry sensor 113 of the defense decision device 110 can include software stored in the memory 111 and executed in the processor 114 and/or can include hardware to pull telemetry data from a set of data sources. For example, the set of sources can include a compute device 160, a telemetry device 180, a server device 170, a security appliance(s), a data lake(s), a device(s) with security information and event management (SIEM) software, and a device(s) with endpoint detection and response (EDR) technology, cloud telemetry, and/or the like. The telemetry data received by the telemetry sensor 113 from the data lake can indicate a presence and an abundance of a log type or event logs (e.g., windows security event log). For example, a data lake containing Windows security event logs with an event code of 4688 can indicate a presence of a process creation telemetry. In some implementations, the set of sources may include security appliances that do not feed into the data lake. Therefore, the telemetry sensor 113 can query the security appliances directly using an application programming interface (API) of the security appliances. It is often possible to query a security appliance through its API to determine availability of telemetry data for that security appliance. If the telemetry data is not available through the API, however, other methods can be used to obtain the telemetry data. For example, a user can manually enter telemetry data provided by a data source. A status of the data source can be monitored for being up or down via an automated ping check. In some instances, a third-party monitoring tool like Nagios® can be used to monitor the status of the data source.

The processor 114 can be, for example, a hardware based integrated circuit (IC) or any other suitable processing device configured to run or execute a set of instructions or a set of codes. For example, the processor 114 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. In some instances, the processor 114 can be operatively coupled to the memory 111 through a system bus (for example, address bus, data bus, and/or control bus, not shown).

The processor 114 includes decision support logic 120. The decision support logic 120 can include hardware and/or software that help the defense decision device 110 automate various cyber defense decisions, support actions, and/or remedial actions in a technical fashion and at machine speed. The decision support logic 120 can include the techniques, the validation instances, the detection instances, the telemetry data, identifiers, primitives, subcategories, categories the mitigations, the groups, the software/malware, and/or the like. In some implementations, the decision support logic 120 can include instructions and/or software stored/loaded in the memory 111 and executed by the processor 114. For example, a code to cause the decision support logic 120 to respond to cyber threats and changes to the defense posture of the defense environment 101 can be stored in the memory 111 and executed by the processor 114. Alternatively, or in addition, in some implementations, the decision support logic 120 can include a hardware-based device. For example, a process to cause the processor 114 to determine an overlap in the telemetry data can be implemented on an individual integrated circuit chip.

In use, as real time data or substantially real time data (e.g., telemetry data received from a compute device 160, a server device 170, a telemetry device 180, and/or the like) is mapped, the defense decision device 101 can process and analyze the data to deduce new information. The term "substantially" in this context is defined functionally where a time of receiving the telemetry data does not impact a detection coverage of the defense decision device 101 at that time or after that time. For example, substantially real time can allow for telemetry data to be received with a slight delay in milliseconds range, seconds range, or minutes range where such delay does not impact the detection coverage of the defense decision device 101. By using mappings and scorings of adversarial groups and software. In some instances, the defense decision device 110 can produce a threat model to calculate an estimated detection coverage. In some instances, the number and fidelity of detection instances in the defense environment 101 mapped to a technique can be used to calculate the estimated detection coverage for that technique. Processing the real time data (or substantially real time data) can improve an organization's security posture by automating actions in real time (or substantially real time data) at machine speed (i.e., processed as the data as received without producing a processing backlog). When the real time data (or substantially real time data) is received, the defense decision device 110 can automatically enable detection instances that rely on that data. Subsequently, assessments that monitor the detection instances can be enabled as well and the detection coverage can then be updated to include the detection instances including newly-added detection instances at machine speed. Conversely, when the real time data (or substantially real time data) is lost, automated actions can be performed such as, for example, generating an email to administrators or generating an alert to analysts. Reception or loss of the real time data (or substantially real time data) can be shown and/or highlighted in the graphical user interface (e.g., security posture visualization) of the defense decision device 110.

The defense decision device 110 can produce a score(s) for each technique based on the analysis of detections, mitigations, groups, software and telemetry by decision support logic 120. The score maybe based on any single or combination of components of the decision support logic 120 and/or calculations performed on the decision support logic 120. For example, each technique without detection coverage can be scored based on actual risk from a threat group and/or malware to provide the user of the defense decision device 110 with key techniques to focus on. In some instances, using the score produced for each component of decision support logic 120, a score report can be generated to help inform the user of the defense decision device 110 about cyber threats and changes to the defense posture of the defense environment 101. For example, in some instances, a score report can be generated to identify major security gaps by techniques, prioritized mitigations based on risk, redundant detection coverage, and lack of validated detections. In some instances, using the score produced for each component of decision support logic 120, the defense decision device 110 can take defense decisions, support actions, and/or remedial actions in a technical fashion and at machine speed. In some instances, the user of the defense decision device 110 can take a subset of the defense decisions, a subset of the support actions, and/or a subset of the remedial actions in response to the score report.

In some implementations, the processor 114 of the defense decision device 110 can include a machine learning model (not shown). In some configurations, the machine learning model can be software implemented as a set of codes stored at and executed by the defense decision device 110. In some configurations, the machine learning model can be hardware implemented as an integrated circuit (IC) that is executed by the defense decision device 110. The machine learning model can be trained during a training phase and executed during an execution phase.

During the training phase, the machine learning model (not shown) can receive training data including (1) historical telemetry data, (2) historical detection instances, and (3) historical set of adversarial techniques. The term 'historical' here refer to past (e.g., past week, past month, past year, and/or the like). For example, the historical telemetry data, the historical detection instances, and the historical set of adversarial techniques can refer to telemetry data, detection instances, and set of adversarial techniques that were collected previously (e.g., during past week, during past year, and/or the like). The historical telemetry data were used or can be used to detect the set of historical adversarial techniques in a set of environments. The set of environments (also 'the set of defense environments') can include a variation of a set of individual compute devices, a variation of a set of compute systems, a variation of a set of operatively coupled compute devices in a local area networks (LAN), and/or the like. Each environment from the set of environments can have its own set of attributes such as an association(s) to an organization(s), an operating system(s) of the environments, a decision support logic(s), a telemetry sensor type(s), a connectivity attribute(s), and/or the like. Historical detection instances were queried or can be queried against the historical telemetry data to detect the historical set of adversarial techniques in the set of environments. The training data can be divided to a training set and a testing set by a ratio (e.g., 80% training set and 20% testing set). Each of the training set and the testing set can be divided into batches of data and be interactively and/or randomly used to optimize/improve a set of model parameters of the machine learning model against an objective function. The set of model parameters of the machine learning model can include for example, a set of arithmetic and/or a set of logical variables that can be tuned to adjust an output of the machine learning model. The objective function can be for example, a root mean squared error (RMSE)-based function of occurrences of the set of adversarial techniques and/or confidence scores for the occurrences of the set of adversarial techniques. Once trained, the trained machine learning model can be executed to predict an occurrence of an adversarial technique and a confidence score for the occurrence of the adversarial technique.

During the execution phase, the trained machine learning model (not shown) can receive, from an environment, (1) telemetry data not included within the historical telemetry data or (2) at least one detection instance not included within the historical detection instances. In some instances, the environment can be the same as any of environment from the set of environments. For example, a first environment can have the exact same attributes as an environment from the set of environments. The first environment and the environment from the set of environments can both, for example, have an association to a government organization (resulting in being prone to cyber-attack), include an Ubuntu™ Linux-based operating system running, and/or be connected to the Internet via a fifth generation (5G) network. In some instances, the environment can be similar to any environment from the set of environments. Here, a similarity between environments can depend on similarity between technologies used in the environments and/or similarity between attributes in the environments. In another example, relative to the above example, a second environment can have similar attributes to the environment from the set of environments. The second environment can have, for example, an association to an international organization (resulting in being prone to cyber-attack), have a Redhat™ Linux-based operating system, and/or be connected to the Internet via a WiFi™ network. In yet another example, relative to the examples above, a third environment can have different ('not similar') attributes compared to environment from the set of environments. The second environment can have, for example, an association to a hospital (resulting in being less prone to cyber-attack), have an android-based operating system (significantly different from Linux operating systems), not connected to the Internet (on a local area network). The trained machine learning model can be executed by the processor 114 based on the telemetry data and the at least one detection instance to predict an occurrence of an adversarial technique and a confidence score (e.g., 85% confidence score, 98% confidence score, and/or the like) for the occurrence of the adversarial technique.

The trained machine learning model, in some implementations, can be trained and configured to predict an attack chain response action. For example, the trained machine learning model can predict an adversary attack chain that includes a first adversarial technique and a second adversarial technique that is predicted to occur subsequent to the first adversarial technique. The trained machine learning model can also predict an attack chain response action to prevent the second adversarial technique after the occurrence of the first adversarial technique and before an occurrence of the second adversarial technique. For example, the machine learning model can be a neural network that is trained on time series of adversarial techniques and/or attack chain response actions. The trained machine learning model can, therefore, receive a first time series data and generate a second time series data based on the first time series data. For example, the trained machine learning model can be configured to receive an occurrence of a first set of timestamped adversarial techniques (e.g., detected by telemetry sensor(s)) and predict an occurrence of a second set of timestamped adversarial techniques and/or a set of timestamped attack chain response actions based on the first set of timestamped adversarial techniques. Thus, the trained machine learning model can analyze adversarial techniques and generate appropriate response actions in response to the adversarial techniques in substantially real-time (e.g., 100 milliseconds, 500 milliseconds, 1 second, 5 seconds, 10 seconds, 50 seconds, 100 seconds, 500 seconds, and/or the like).

In some instances, the defense decision device 110 (also referred to as 'the first device') can receive a signal (an electrical signal, a radio frequency (RF) signal, and/or the like) representing telemetry data and a detection instance of the environment from a second device (e.g., the compute device 160, the server device 170, the telemetry device 180), via the network). The second device identifies the telemetry data such that at least a portion of the telemetry data is indicative of the set of adversarial techniques in the environment. The second device can identify the telemetry data by automatically sensing the telemetry data in a device/system (e.g., a data lake, an intrusion detection system (IDS), an intrusion prevention system (IPS), a network appliance, an endpoint protection platform (EPP), and/or the like) and/or by automatically fetching the telemetry data in a software/database (e.g., a firewall, an endpoint detection and response (EDR), cloud telemetry, an anti-virus (AV) software, and/or the like). The second device determines a detection instance queryable against the telemetry data to detect the set of adversarial techniques in the environment. Then, the second device can send a signal representing the telemetry data and the detection instance to the first compute device.

In response to receiving the signal representing the telemetry data and the detection instance of the environment, the first device can identify detection coverage of the set of adversarial techniques based on the telemetry data and the detection instance of the environment. The first device can then determine a subset of detection coverage to have a metric value below a metric value threshold and among the detection coverage for the set of adversarial techniques. The first device can then identify at least one detection instance associated with the subset of detection coverage for the set of adversarial techniques. In some instances, the first compute device can present a representation of at least one of the subset of detection coverage or the at least one detection instance associated with the subset of detection coverage to a user via a graphical user interface of the first device (not shown). The first compute device can then update, in substantially real time, the subset of detection coverage based on at least the telemetry data or the detection instance of the environment. Substantially real time in this context refers to a speed not achievable by a user(s), an operator(s), or known software. For example, the first compute device can update the subset of detection coverage with a slight delay in milliseconds range, seconds range, or minutes range depending on scope of the subset of detection coverage. The delay would be small and would not impact the detection coverage of the defense decision device 101. Updating the subset of detection coverage can result in improving the metric value of the subset of detection coverage to above the metric value threshold.

Although, in some embodiments, the defense decision system 110, the device 160, and the database 170 are shown and describe as singular devices, it should be understood that, in some embodiments, one or more defense decision systems, one or more devices, and one or more databases can be used in the defense decision system 110.

Figure 2:
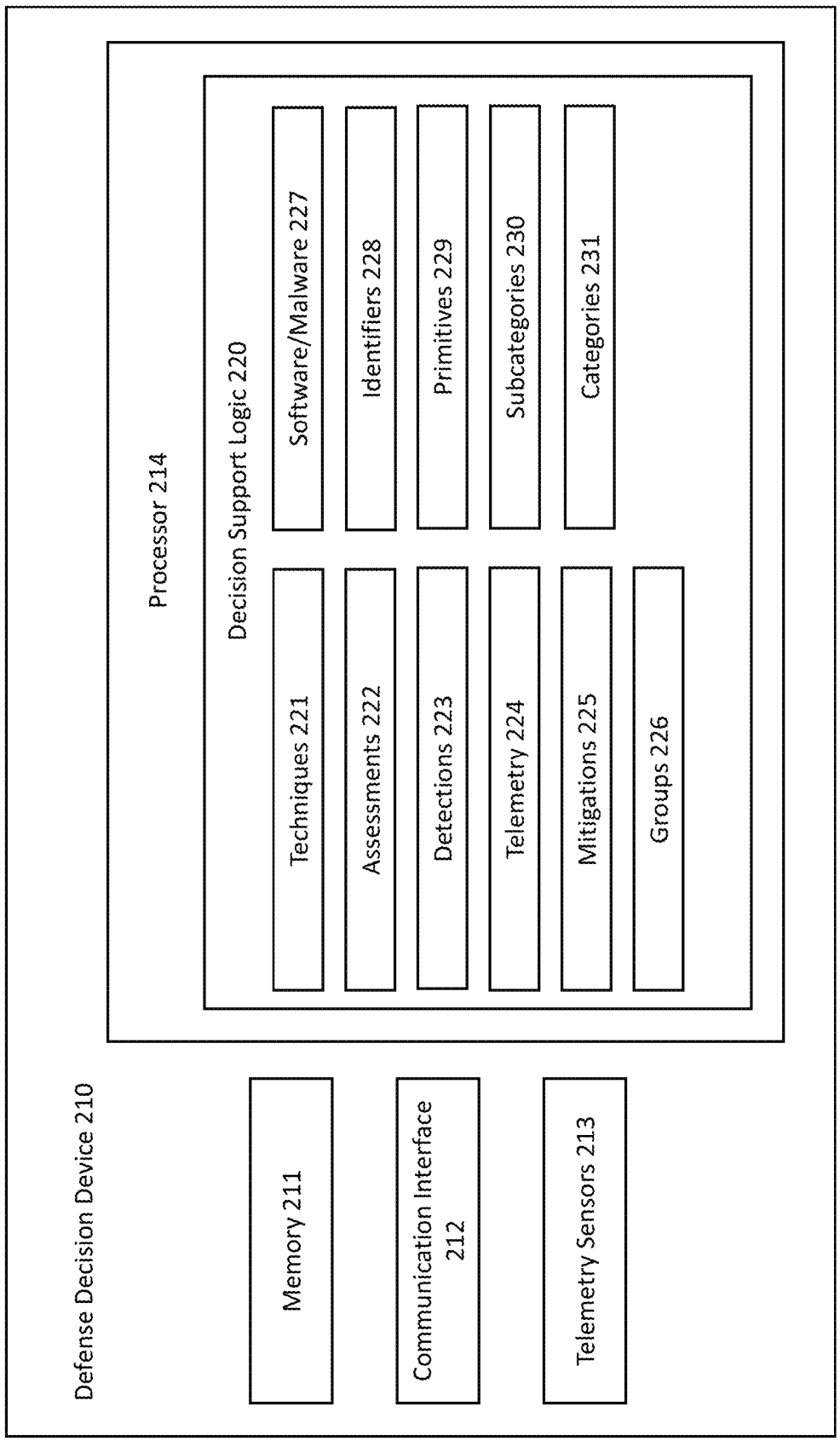
FIG. 2 is a schematic block diagram of a defense decision device, according to an embodiment.

FIG. 2 is a schematic block diagram of a defense decision device 210, according to an embodiment. The defense decision device 210 includes a memory 211, a communication interface 212, a telemetry sensor 213, and a processor 214. The memory 211, the communication interface 212, the telemetry sensor 213, and the processor 214 which can be structurally and/or functionally similar to the memory 111, the communication interface 112, the telemetry sensor 113, and the processor 114 shown and described with respect to FIG. 1. The processor 214 includes decision support logic 220 that can include hardware and software that help the defense decision device 210 to automate various cyber defense decisions, support actions, and/or remedial actions in a technical fashion and at machine speed. The decision support logic components 220 include data, models, instructions, and/or the like and can be categorized into techniques 221, assessments 222 (also referred to as 'validation instances'), detections 223 (also referred to as 'detection instances'), telemetry 224, mitigations 225, groups 226, software/malware 227, identifiers 228, primitives 229, subcategories 230, categories 231 and/or the like.

Generally, the techniques 221 represent methods an adversary uses to achieve an objective. The techniques can be provided by a sub-framework from the meta-framework. The validation instances can be/include detection validation tests built into the defense decision device 210. In some implementations, detection validations tests can be provided by a set of adversarial emulation tools. Some examples of adversary emulation tools include Verodin® Security Platform, Red Canary® Atomic Red Team, and AttackIQ. In some embodiments, a user (skilled in emulating adversarial cyber actors) of defense decision device 210 may be granted a permission to perform the detection validation tests.

The detection instances can include techniques, models, and/or logic instances used to identify a potentially malicious activity. The detection instances can be generated and/or received, for example, by a wide variety of security products including a device(s) with endpoint detection and response (EDR) tools, network security appliances, and a device(s) with security information and event management (SIEM) software. The detection instances can include detection instances that are pulled in from a set of sources (e.g., the compute device 160, the server device 170, and/or the telemetry device 180 as shown and described with respect to FIG. 1), and detection instances that are built into the defense decision device 210. In some instances, an adversarial technique framework loaded at the defense decision device can include tools that map to related detection instances and alert on that adversarial technique being leveraged within the monitored environment.

The telemetry 224 can include software and/or hardware that can provide/fetch telemetry data used to implement a detection. The telemetry sensor 213 and/or the telemetry 224 of the defense decision device 210 can detect and/or fetch telemetry data and/or changes to telemetry data in substantially real time for security appliances that can reach out to the defense decision device 210 automatically on configuration changes. Such automation can be accomplished using methods including web hooks. For telemetry sources that do not provide a means of substantially real time monitoring, a user can configure the defense decision device 210 to perform regularly occurring queries to monitor the telemetry data from the telemetry sources in substantially real time. Having substantially real time updating of telemetry data can allow for automated actions and the ability for the user to actively monitor a security posture of the defense decision device 210.

The mitigations 225 can include instructions, method, and/or policies that prevent an adversarial technique. In some implementations, the mitigations 225 can be built into the defense decision device 210. A user of the defense decision device 210 can select a subset of mitigations that, for example, are relevant to the user. Additionally, the user can define customized mitigations that map to the techniques 221 with various degrees of detection coverage. It is also possible that the mitigations are provided remotely, for example, by performing a query on Window's Group Policy Objects (GPO). Information about groups 226 (e.g., APT29) can be built into the defense decision device 210 or can be provided by one of many threat intelligence feeds. Additionally, groups 226 can be manually entered into the defense decision device 210. The threat intelligence feeds can be provided to the user of the defense decision device 210 to show potential security gasps and mitigations on which the user should focus and prioritize.

The software/malware 227 can include information about software/malware (e.g., Mimikatz) used by adversarial groups which may be built into the defense decision device 210 or provided by one of many threat intelligence feeds. Additionally, information about software and malware may be manually entered into the defense decision device 210. Similarly, to adversarial groups, Cyber Threat Intelligence Repositories (CTI) (e.g., Collaborative Research into Threats (CRITS™), Hail a TAXII™, MalShare™ VirusShare™, Yara-Rules™, Malstorm™, Scumblr™, Yeti™, Cyber Analytics Repository (CAR™), and/or the like) can provide information on many software and malware tools to the software/malware 227 of the defense decision device 210

The defense decision device 210 can operationalize adversarial technique frameworks. In some instances, the defense decision device 210 can allow a user to select an adversarial technique framework from a set of adversarial technique frameworks (e.g., National Security Agency/Central Security Service Technical Cyber Threat Framework (NTCTF), the MITRE ATT&CK® framework, Lockheed Martin Cyber Kill Chain, Diamond Model and/or the like) available to the defense decision device. The decision support logic 120 including adversarial groups, software, detections, emulated adversarial assessments, telemetry data, mitigations, identifiers, primitives, subcategories, categories and/or the like can be mapped to the adversarial technique framework as input. Additionally, in some instances, the user may be able to manually update the decision support logic 120 and/or manually choose the mapping to the decision support logic 120.

Figure 3:
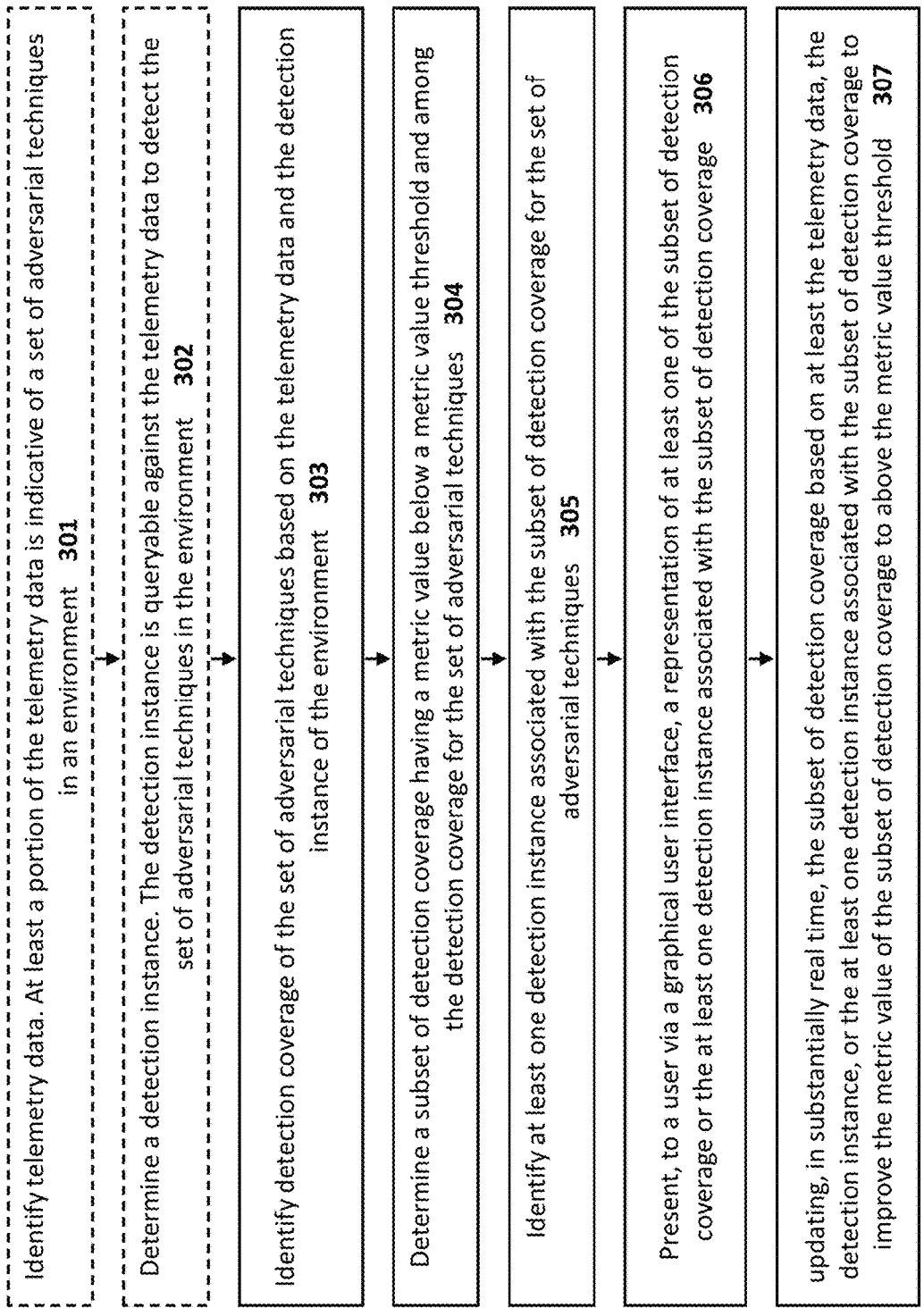
FIG. 3 is a flowchart illustrating a method for supporting cyber defense decision, according to an embodiment.

FIG. 3 is a flowchart illustrating a method 300 for supporting cyber defense decision, according to an embodiment. In some embodiments, the method 300 can be performed, for example, by a defense decision device (such as the defense decision device 110 as shown and described with respect to FIG. 1). The method 300 can optionally include identifying 301, in substantially real time, telemetry data. At least a portion of the telemetry data is indicative of a set of adversarial techniques in an environment, and therefore, can be used to detect a set of adversarial techniques in an environment (e.g., the defense environment as shown and described with respect to FIG. 1). Identifying the telemetry data can be done, for example, by automatically sensing the telemetry data in devices/systems such as, for example, a data lake, an intrusion detection system (IDS), an intrusion prevention system (IPS), a network appliance, an endpoint protection platform (EPP), and/or the like. Identifying the telemetry data can be done, for example, by automatically fetching the telemetry data from a software such as for example, a firewall, an endpoint detection and response (EDR), cloud telemetry, an anti-virus (AV) software, and/or the like. The method 300 can optionally include determining, at 302, a detection instance. The detection instance is queryable against the telemetry data to detect the set of adversarial techniques in the environment.

At 303, detection coverage of the set of adversarial techniques is identified based on the telemetry data and the detection instance of the environment. The detection coverage can then be mapped to an adversarial technique framework. The adversarial technique framework can include a National Security Agency/Central Security Service Technical Cyber Threat Framework (NTCTF), and a MITRE Adversarial Tactics, Techniques, Common Knowledge (ATT&CK®) framework, Lockheed Martin Cyber Kill Chain, Diamond Model, and/or the like.

At 304, a subset of detection coverage can be determined. The subset of detection coverage can have a metric value below a metric value threshold and among the detection coverage for the set of adversarial techniques. The metric value can be, for example, a measure of detection coverage. For example, the metric value (or measure of a detection coverage) can be a ratio of number of incidents in which the detection coverage succeeded to detect an adversarial technique from the set of adversarial techniques to a number of incidents in which the detection coverage failed to detect an adversarial technique from the set of adversarial techniques. The metric value threshold can be a preset value standard. In some instances, if the metric value of the subset of detection coverage is below the metric value threshold, the subset of detection coverage can be classified/categorized as no coverage. In some instances, if the metric value of the subset of detection coverage is above the metric value threshold, the subset of detection coverage can be classified/categorized as good coverage. In some instances, each adversarial technique within the detection coverage is associated with a value that is in a range between a maximum detection coverage and a minimum detection coverage. The minimum detection coverage and the maximum detection coverage can be associated to a minimum value and maximum value of a normalized range such as, for example, 0 to 1, −1 to 1, 0 to 100, and/or the like. Moreover, the metric value threshold can be determined to be between the minimum detection coverage and the maximum detection coverage. In some embodiments, determination of detection coverage can involve using a rule-based equation (e.g., an empirical relationship), a user choice (e.g., a choice made by the user of the defense decision device), and a machine learning model (e.g., a trained neural network).

At 305, at least one detection instance associated with the subset of detection coverage is identified for the set of adversarial techniques. The at least one detection instance for the set of adversarial techniques can be imported/mapped from at least one framework. The detection instances can be mapped to frameworks through relational association(s). A detection instance can be validated, for example, by simulating an adversarial behavior that the detection instance was created or defined to detect. If the detection instance correctly identifies the simulated adversarial behavior, the detection instance is cataloged and mapped to an appropriate adversarial technique outlined on the at least one framework. The at least one detection instance can be used to identify a potentially malicious activity. The at least one detection logic can come from a wide variety of security products including open-source repositories, EDR tools, network security appliances, SIEM software, and/or the like.

At 306 a representation of at least one of the subset of detection coverage or the at least one detection instance associated with the subset of detection coverage is presented to a user via a graphical user interface of a device (e.g., the defense decision device 110 as shown and described with respect to FIG. 1). The representation of the subset of detection coverage can include a visual representation, for example, having a geometrical shape with color coding and shading representing the subset of detection coverage and/or the metric value of the subset of detecting coverage. In some instances, the representation of the subset of detection coverage can include scores and reports.

At 307, the subset of detection coverage can be updated, in substantially real time, based on at least the telemetry data, the detection instance, or the at least one detection instance associated with the subset of detection coverage to improve the metric value of the subset of detection coverage to above the metric value threshold. A set of remedial actions can be taken to improve the metric value to ensure coverage of the subset of detection coverage. For example, in some instances, the defense decision device can improve the metric value of the subset of detection coverage to above the metric value threshold by receiving, querying, and/or analyzing the telemetry data in substantially real time, or enabling and/or updating newly-added data (e.g., the telemetry data, the detection instance, or the identified at least one detection instance). In some instances, after enabling and/or updating newly-added data, the subset of detection coverage can be emulated to evaluate the metric value to assess a change in the metric value. The defense decision device can perform the emulation of detection coverage and/or the evaluation of the metric value automatically and at machine speed. Subsequently, assessments that monitor the detection coverage can be enabled and/or updated to include/cover the newly-added data in substantially real time.

In some implementations, the method 300 can optionally include determining, in substantially real time, an overlap(s) in the telemetry data that detect the set of adversarial techniques. Presence of the overlap(s) in the telemetry data can be detected by passively monitoring data sources such as a telemetry sensor(s), for example, in a defense environment, across a network, and/or the like. The overlaps in the telemetry can be leveraged to optimize telemetry storage costs. The method 300 can optionally include identifying an overlap(s) in the detections that query the telemetry. The overlaps in the detections can be leveraged to confidently consolidate cyber tools (e.g., improve components of the decision support logic 220 of the defense decision device 210 as shown and described with respect to FIG. 2).

The defense decision device in addition to identifying the overlap can manage or remediate a source of the received telemetry data based the overlap, which could result in stack consolidation or an opportunity to make expensive data lake storage more cost efficient. In some instances, the defense decision device can automatically and at machine speed detect the presence of telemetry overlap by passively monitoring data sources transmitting across a network. Determining and/or eliminating the overlap in the telemetry data can be used to lower an organization's data lake storage costs while still maintaining useful information of overlapped telemetry data. Therefore, the overlap in the telemetry data can be eliminated (or reduced) from the telemetry data without reducing a detection coverage of the defense decision device. In some embodiments, the defense decision device can receive and/or analyze the telemetry data from a cloud-based device (such as the server device 170 and/or the telemetry device 180 as shown and described with respect to FIG. 1). For example, the cloud-based device can receive and/or analyze the telemetry data using one or more application programming interface (API).

In some implementations, the method 300 can optionally include evaluating a performance of the telemetry and how often the telemetry is used to detect adversarial techniques. Evaluating the performance of the telemetry data can help determine cost-efficient telemetry storage strategies. Therefore, the method 300 can optionally include reducing a telemetry data storage cost based on the performance of the telemetry data.

In some implementations, the method 300 can optionally include evaluating a performance of detection instances. Evaluating the performance of detections can help identify detection triage inefficiencies. Therefore, the method 300 can optionally include identifying detection triage inefficiencies based on the performance of detection instance.

In some implementations, the method 300 can optionally include evaluating a workforce competency on a detection-by-detection basis. Evaluating the workforce competency can help determine areas of strength and weakness (e.g., efficient detection triage time with host-based detection vs. inefficient triage time with network-based detections). Therefore, individualized training prescription to bolster areas of weakness can be organized. Similarly, in some embodiments, the method 300 can optionally include cyber tool competency assessments to determine which cyber tools performs efficiently or inefficiently. For example, a cyber tool can be assessed based on a score (e.g., a score between 0 and 100). Assessing the cyber tools can help in informed product replacement decision making.

In some implementations, before determining an overlap in telemetry data, the telemetry data can be sent automatically from a telemetry sensor. A mitigation recommendation can be defined based on the subset of detection coverage having the metric value below the metric value threshold. The mitigation recommendation can then be presented to a user via the graphical user interface. Based on the presented mitigation recommendation, the user can choose to implement the mitigation recommendation.

In some embodiments, a defense decision device can identify a first set of adversarial techniques and a second set of adversarial techniques. The first set of adversarial techniques can be mapped to the telemetry data without an overlap/duplicate; the second set of adversarial techniques can be mapped to the overlap in the telemetry data. In such embodiments, the second set of adversarial techniques can be different from the first set of adversarial techniques and further improve a performance of the defense decision device.

In some embodiments, the detection coverage can include a first subset of detection coverage with a first metric value and a second subset of detection coverage with a second metric value larger than the first metric value. In some instances, at a first time the first metric values can be below the threshold and the second metric values can be above the threshold. The first metric values can be improved using the same methods described above at the 306 automatically and at machine speed. In some instances improving the first metric values for the first subset of detection coverage can also improve the second metric values for the second subset of detection coverage. For example, updating detection instances from a server device (such as the server device 170 as shown and described with respect to FIG. 1) to improve the first metric values can also (in part) updates detection instances related to the set of adversarial techniques and also improve the second metric values.

In some embodiments, the method 300 can optionally include generating historical telemetry data, historical adversarial techniques, and historical detection instances by storing the telemetry data, adversarial techniques relevant to those telemetry data, and detection instances during a time interval. The time interval can be determined case by case. In some instances, the time interval can be an hour, a day, a month, a year, and/or the like. A machine learning model (e.g., an artificial neural network) can be trained based on the historical telemetry data, the historical adversarial techniques, and/or the historical detection instances. The machine learning model can be trained, for example, using a gradient descent and by iteratively executing the machine learning model to optimize an output of an objective function. Once trained, the machine learning model can receive (1) telemetry data not included within the historical telemetry data and/or (2) at least one detection instance not included within the historical detection instances. The machine learning model can be executed to predict an occurrence of an adversarial technique and a confidence score for the occurrence of the adversarial technique, based on the telemetry data and the at least one detection instance.

In some instances, the machine learning model can be executed to predict an adversary attack chain that includes an occurrence of a first adversarial technique and a second adversarial technique subsequent to the first adversarial technique. The machine learning model can be executed to predict an attack chain response action(s) to prevent the second adversarial technique after the occurrence of the first adversarial technique and before an occurrence of the second adversarial technique. In some instances, the machine learning model can be a neural network that is configured to receive a first time series data and generate a second time series data based on the first time series data. For example, the neural network can be configured to receive an occurrence of a first set of timestamped adversarial techniques (e.g., detected by telemetry sensor(s)) and predict an occurrence of a second set of timestamped adversarial techniques based on the first set of timestamped adversarial techniques.

In some examples, the machine learning model for analyzing time series data can include, a multi-layer perceptron model, a Bayesian neural network model, a radial basis function model, a generalized regression neural network model, a K-nearest neighbor regression model, a classification and regression trees (CART) model, a support vector regression model, a Gaussian processes model, a recurrent neural network model, and/or the like.

The organization's data lake storage can include, for example, Splunk®, ArcSight®, Elastic®, QRadar®, LogRythm®, DataDog®, and/or the like. The organization can be incentivized to store only what is absolutely needed in the data lake storage. The defense decision device can help an organization to only store Sysmon Event Code 19 for detecting WMI EventFilter activity in the data lake storage. When the defense decision device senses the Sysmon telemetry feed has gone/is going down, the defense decision device could automatically enable a logging of Windows Event Codes 5861, 5858, and 5859, which provide the same data. Therefore, instead of logging overlapping telemetry data, the defense decision device can detect telemetry overlap and enable/disable sending overlapping telemetry to data lake solutions in a cost efficient manner while still maintaining the ability to alert on a specific adversarial technique.

Figure 4:
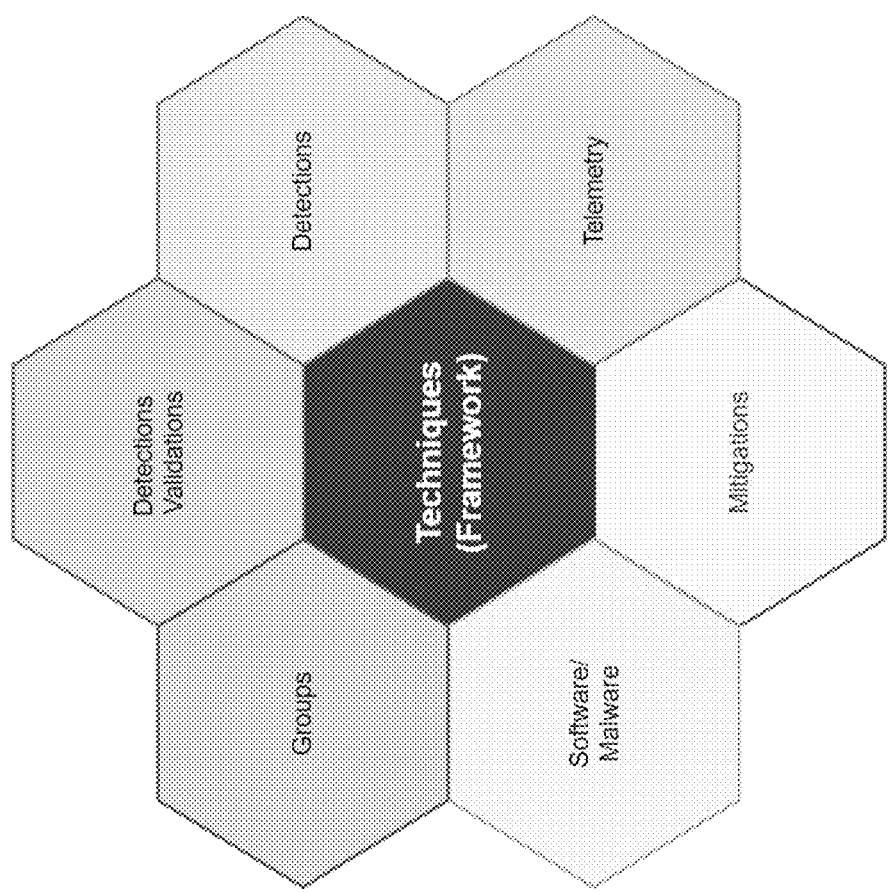
FIG. 4 is a schematic block diagram of techniques of a defense decision device, according to an embodiment.

FIG. 4 is a schematic block diagram of techniques of a defense decision device, according to an embodiment. The defense decision device (such as the defense decision device 110 as shown and described with respect to FIG. 1) automates defense decision and response actions at machine speed by ingesting and analyzing a set of decision support logic 120. The components of decision support logic 120 include, for example, techniques, assessments (also referred to as 'validation instances'), detections (also referred to as 'detection instances'), telemetry data, mitigations, groups, software/malware, identifiers, primitives, subcategories, categories and/or the like.

The techniques (presented as the center hexagon in FIG. 4) can include an adversarial tactic(s), an adversarial technique(s), and/or an adversarial procedure(s) (e.g., a common adversarial tactic). The techniques can be provided by an underlying sub-framework of the meta-framework. Generally, the techniques represent methods an adversary can use to achieve an objective. Therefore, the sub-framework(s) can group the techniques by the adversarial tactic(s) and/or an adversarial tactical objective(s). The techniques provide the central mapping for all other decision support logic 110 in the meta-framework. For example, a technique can include a credential dumping technique.

The validation instances include an action(s) that is often performed by adversarial cyber actors and/or is designed and performed to test detection capability. In some instances, the validation instances can be categorized under an umbrella term of "Purple Teaming". In some instances, the validation instances generally can include a specific set of actions, known to be performed by an adversarial group(s), that are executed in a defended environment (e.g., a compute device using the meta-framework) to validate the detection instances and the mitigations. The defense decision device automates and performs the validation instances at machine speed. The detection instances can include a logic, a query, or a signature that is used to identify a potentially malicious activity. The detection instances can be provided by the defense decision device or by an external source(s) (e.g., a third part service such as the server 170 as shown and described with respect to FIG. 1A). The detection instances are often in vendor-agnostic rule formats. In some instances, a number and fidelity of the detection instances in the defended environment based on their mapping to techniques can provide an estimated cyber defense coverage. An example of a detection is "Microsoft Word Spawning PowerShell". The meta-framework automates and performs the validation instances and detection instances at machine speed.

Telemetry can include hardware, data, and/or software to provide telemetry data used to implement a detection instance. In some instances, the defense decision device can provide static telemetry, while in some other instances, the defense decision device can provide varying types telemetry. In some instances, telemetry can include data provided by compute devices, server devices, cloud products, and/or telemetry devices connected to the defense decision device via a network (such as the network 150 as shown and described with respect to FIG. 1). By monitoring the telemetry data, an organization using the defense decision device can update and improve a security model in substantially real time.

Mitigations can include any apparatus, methods, or systems that can prevent an adversarial technique. Therefore, mitigations can be considered the foundation of an organization's security. Mitigations include patching and policies that protect an environment. In some embodiments, the mitigations and detection instances can be used together to provide a robust detection and response capability. In some instances, a strong mitigation actions can reduce a dependence on the detection instances.

Groups can include sets of related intrusion activities that are labeled/tracked under a common name. In some instances, the common name can be/include a common name used in the security community. An example of a group can be/include APT29. Software and Malware are tools used by adversarial groups to accomplish tactical objectives. An example of software/malware can be/include Mimikatz.

Figure 5:
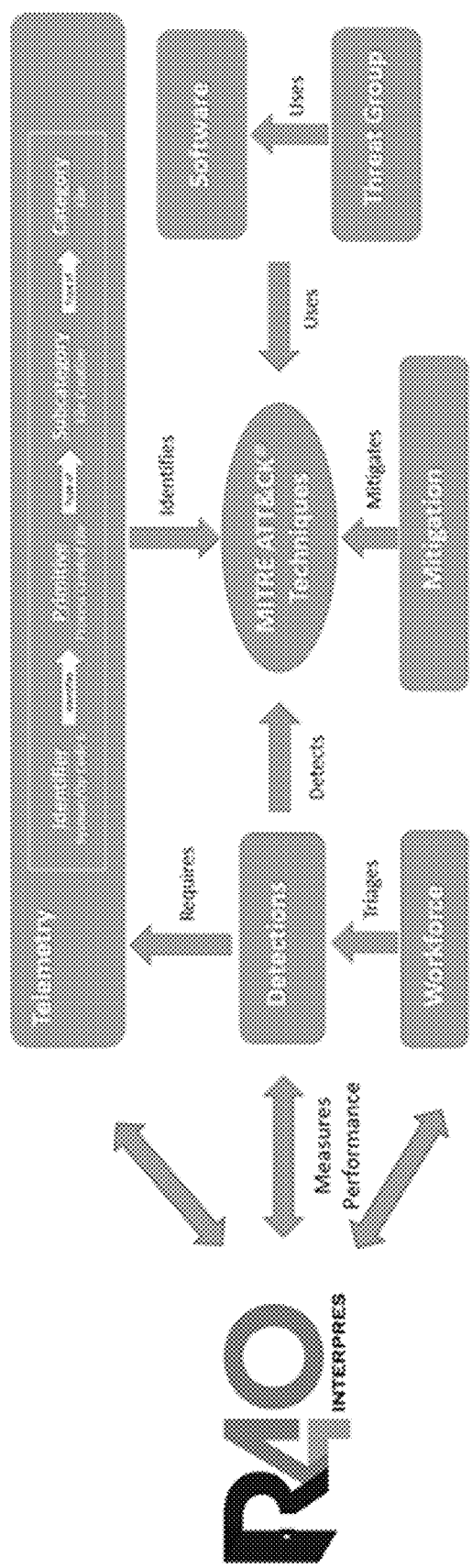
FIGS. 5 and 6 are schematic block diagrams of techniques of a defense decision device, according to an embodiment.
Figure 6:
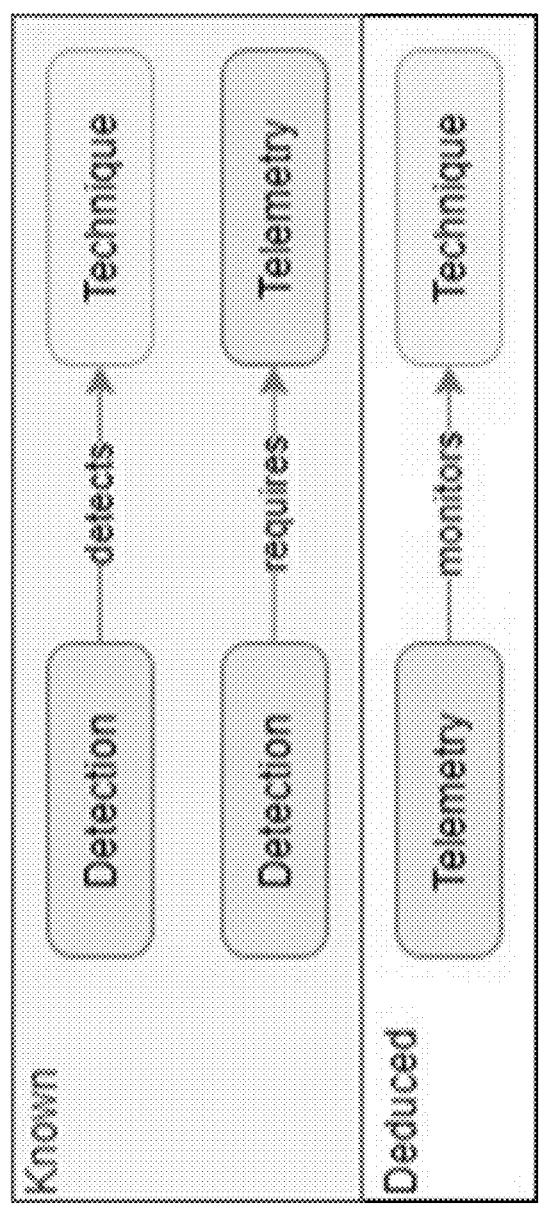

FIGS. 5 and 6 are schematic block diagrams of techniques of a defense decision device, according to an embodiment. The defense decision device (such as the defense decision device 110 as shown and described with respect to FIG. 1A) include techniques (e.g., a cyber adversarial technique) ingested from an integrated adversarial technique framework (a sub-framework of a meta-framework). For each technique (e.g., cyber adversarial technique), the meta-framework can define relationships between decision support logic 110 components (e.g., techniques, assessments, detection instances, telemetry, mitigations, groups, software/malware, identifiers, primitives, subcategories, categories and/or the like) of the meta-framework. The relationships between decision support logic 110 components of the meta-framework can result in identifying new properties and/or new relationships. For example, the relationships between decision support logic 110 components of the meta-framework can, in some instances, imply a transitive relationship that may in turn result in identifying new mappings. For example, if an emulated assessment and/or a real scenario assessment validates a detection that maps to a technique, a transitive relationship indicates that the emulated assessment can also map to that technique. In some implementations, the meta-framework may apply the new mappings automatically to each applicable element. Therefore, in some instances, when a mapping is updated, the software can loop over all relationships or a portion of all relationships and look for and/or apply newly-found transitive relationships.

Figure 7:
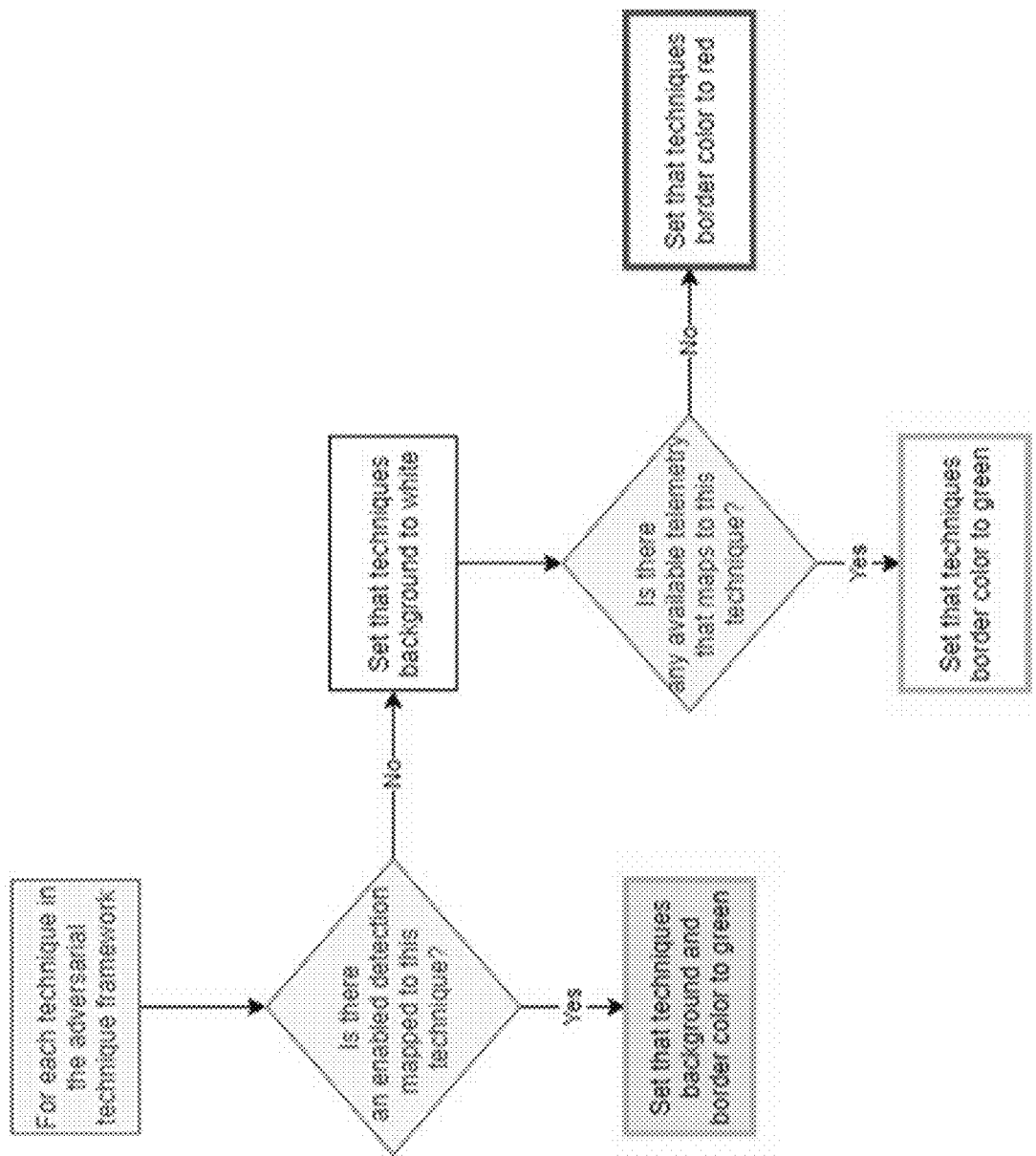
FIG. 7 is a flowchart of a method for presenting a detection coverage of a defense decision device, according to an embodiment.

FIG. 7 is a flowchart of a method for presenting a detection coverage of a defense decision device (such as the defense decision device 110 as shown and describe with respect to FIG. 1). The method can include determining whether a detection instance is mapped to each adversarial technique. If the detection instance is mapped to the adversarial technique, the defense decision device can set the background of the adversarial technique to green for presentation to a user of the defense decision device. If the detection instance is not mapped to the adversarial technique, the defense decision device can set the background of the adversarial technique to white for presentation to the user of the defense decision device. The method can include determining whether a telemetry sensor and/or telemetry data is mapped to the adversarial technique without a detection instance mapped to it. If telemetry sensor and/or telemetry data is mapped to the adversarial technique, the defense decision device can set the border color of the adversarial technique to green for presentation to the user of the defense decision device. If telemetry sensor and/or telemetry data is not mapped to the adversarial technique, the defense decision device can set the border color of the adversarial technique to red for presentation to the user of the defense decision device. In some instances, the adversarial technique can be shaded based on a number and a quality of the detection instance applied. The adversarial technique can also be tagged with information about the detection instance and/or the adversarial technique. For example, the information can include a number of data sources, a number of detection instances, a health status of the telemetry sensor and/or telemetry data, a prevalence of the adversarial technique based on a threat intelligence, and/or the like. Note that the reference to colors green, red and white are merely examples and any other sets of color or visual indicators are possible.

Figure 8:
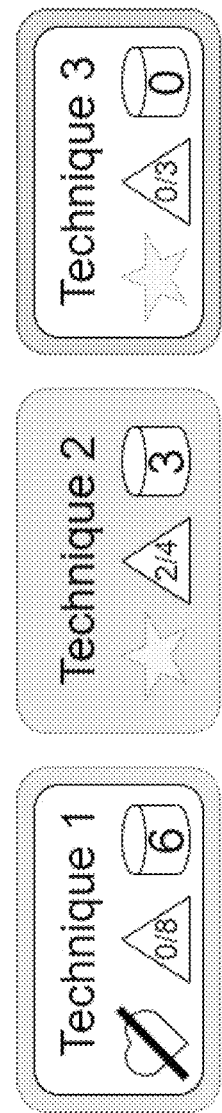
FIGS. 8 and 9 are examples of visualization of information about adversarial-technique detection capability and telemetry overlap of a defense decision device, according to an embodiment.
Figure 9:
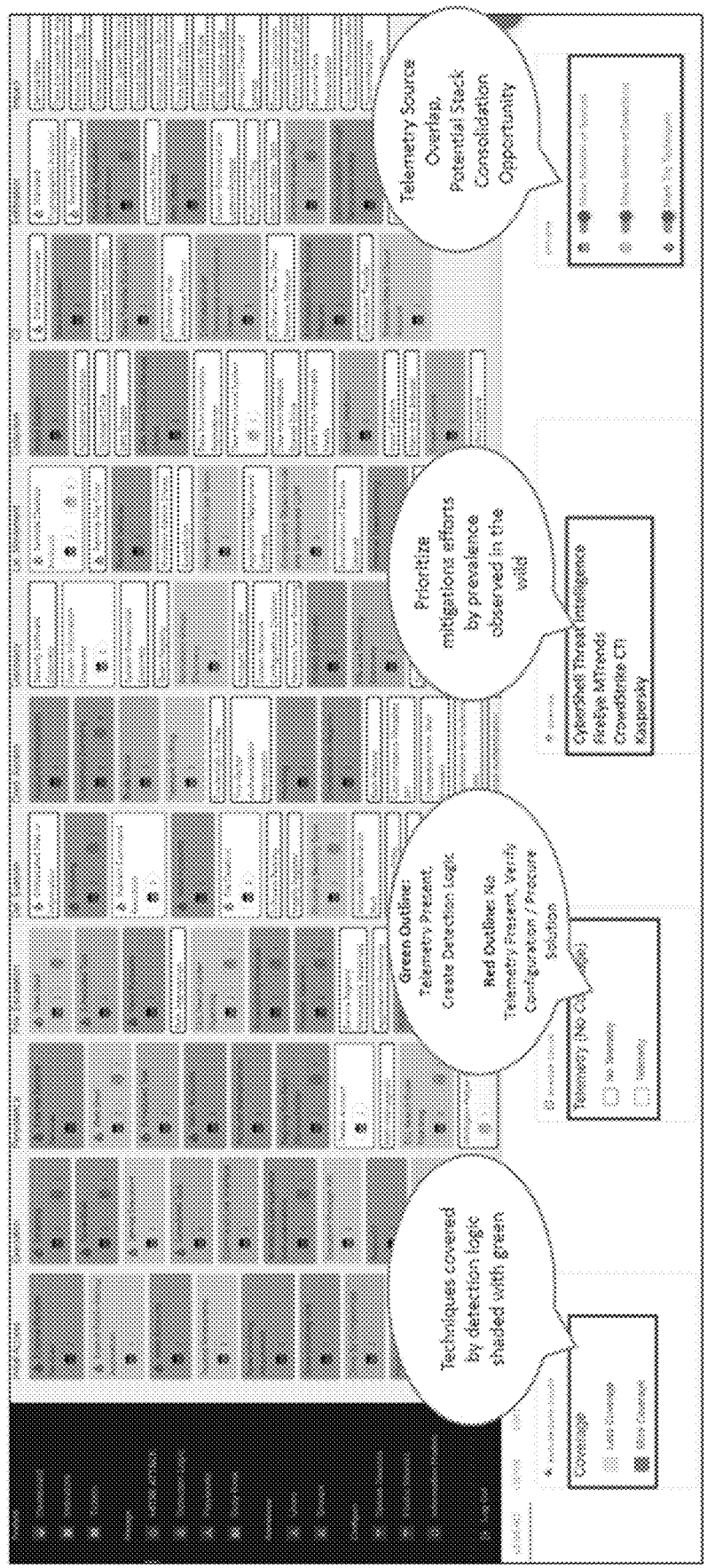

As shown in FIGS. 8 and 9, in addition to automated actions, a defense decision device (such as the defense decision device 110 as shown and described with respect to FIG. 1) may produce various outputs including visualizations, scores, and reports. The decision support logic 110 components mentioned above (such as the decision support logic 120 as shown and described with respect to FIG. 1), and calculations and analysis performed using those primitives can be used to generate user-friendly visualizations. As each decision support logic 110 component, calculation, and/or analysis gets mapped to a technique, a statistical analysis (e.g., total number of) of each decision support logic 110 component, calculation, and/or analysis separately or all together can be processed and displayed. The decision support logic 110 components, the calculation, and/or the analysis can be shown in various ways including a use of color gradients, symbols, elevation, ordering, filtering, and font styling. For example, each technique can be shown individually and having an inner fill color based on the coverage and border color on the presence of telemetry. In some instances, techniques that are enabled for detection instances and provide detection coverage are filled with a green color and the number of enabled detection instances over total detection instances are displayed in a triangle. In some instances, techniques with telemetry data have a green border, techniques without telemetry data have a red border, and a total number of telemetry sources can be displayed in a cylinder icon. In some instances, prevalent adversarial techniques are noted with a gold star and techniques where there is a health alert are marked with a heart with a slash through it.

Although mitigations are discussed above in the context of a mitigation preventing an adversarial technique, it should be understood that such a mitigation need not be limited to just preventing a single adversarial technique. Rather, a mitigation or set of coordinated mitigations can be selected (or predefined, or selected, or configured) to prevent not only an initial adversarial technique but also possible subsequent adversarial techniques. Any given adversarial technique cannot move (or be followed by) any other adversarial technique, but instead can only move (or be followed by) a subset of possible adversarial techniques. In other words, a given adversarial technique only has a subset of possible subsequent adversarial techniques. Thus, for a given adversarial technique, an attack chain (e.g., an ordered list of possible adversarial techniques that can follow a given adversarial technique) can be identified (or predicted), for example, by machine learning models/techniques. This allows a system (e.g., defense decision device 210 of FIG. 2), at machine speed, to predict a future adversarial technique(s) that follow a given adversarial technique and select/take mitigations prior to an adversary moving to that future adversarial technique(s).

Figure 10:
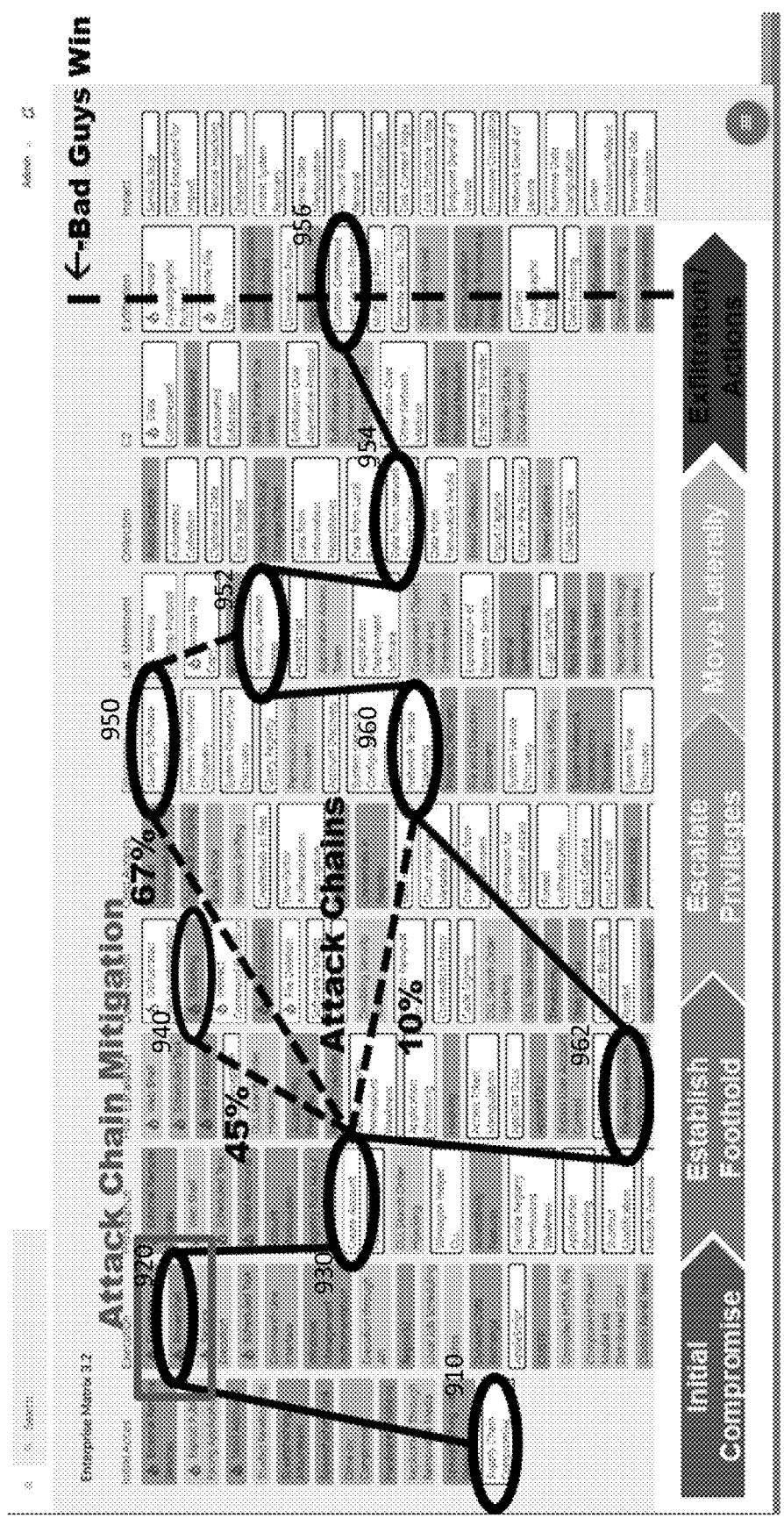
FIG. 10 is an example visualization of information about adversarial-technique detection ability, identified attack chains, and targeted mitigations to interrupt an adversary's ability to execute the attack chains of a defense decision device annotated to illustrate an attack chain mitigation, according to an embodiment.

For example, FIG. 10 is an example visualization of information about decision support logic 110 of a defense decision device annotated to illustrate an attack chain mitigation, according to an embodiment. As shown in FIG. 10, an adversary can obtain initial access through a supply chain comprise 910. Without attack chain mitigation, the adversary can progress through 920 to 930 ("Create Account") at which point the adversary has multiple options to pursue additional adversarial techniques: a 45% for progressing to 940 ("Scripting"), 67% of progressing to 950 ("Security Software Discovery"), and 10% of progressing 950 ("Network Service Scanning"). The attack chain based on the progression to 960 can further progress to 962 ("Elevated Execution with Prompt"). The attack chain based on the progression to 950 can further progress to 952 ("Windows Admin Shares"), 954 ("Data from Network Shared Drive") and 956 ("Custom Command and Control Protocol"), at which point the adversary has successfully conducted an exfiltration. One or more embodiments described herein allows organizations to understand which attack chains are possible within their environment and which attack chains act as an input for the most impactful mitigation recommendations. For instance, if it is known (through threat intelligence) that adversaries leverage powershell (920) techniques often within a specific business sector (e.g., financial institutions), mitigation recommendations can be prioritized based on the threats and based on what techniques an adversary can leverage in the specific business environment and based on attacks leveraged in other compromise attempts within the business sector. In this example, a prioritized mitigation recommendation would be to enforce code signing for all powershell scripts allowed to execute within the business information technology infrastructure or limit execution to run out of a specific directory. The system (e.g., defense decision device 210 of FIG. 2) can predict the future adversarial techniques that follow an adversarial technique at 910, and then take predictive an attack chain response actions at 920, preventing any further adversarial techniques.

In some embodiments and/or implementations, the logging, the policies and the configurations of all nodes present within the network (e.g., within an information technology (IT) environment) can be automatically sensed. The automatic sensing can be performed, for example, by sensors (e.g., the telemetry sensors 113, 163 and 173 of FIG. 1) that passively monitor data transmitted across the network by data sources, connecting directly to configuration sources (e.g., nodes within the network) via an API and/or via user selections. The monitored data (e.g., telemetry data) can be sent automatically from the sensor (e.g., telemetry sensors) and received by a defense decision device (such as defense decision device 110 of FIG. 1). Based on the configurations that are automatically sensed and the related detection coverage (e.g., detection coverage discussed above), mitigation recommendations can be defined (or determined) by the defense decision device, for example, to secure the network/IT environment. These mitigation recommendation can then be, for example, provided to a user via a graphical user interface for user selection. For example, a gap in an organization's ability to detect adversaries due to a lack of logging within data lakes can be automatically detected (or automatically sensed). In addition, logging configurations enforced by Windows Active Directory can be automatically detected (or automatically sensed) and a logging configuration that could be enabled to generate detailed logging can be identified. This allows for a detection to be queried against the detailed execution logs to alert on adversaries using the techniques discussed herein.

Figure 11:
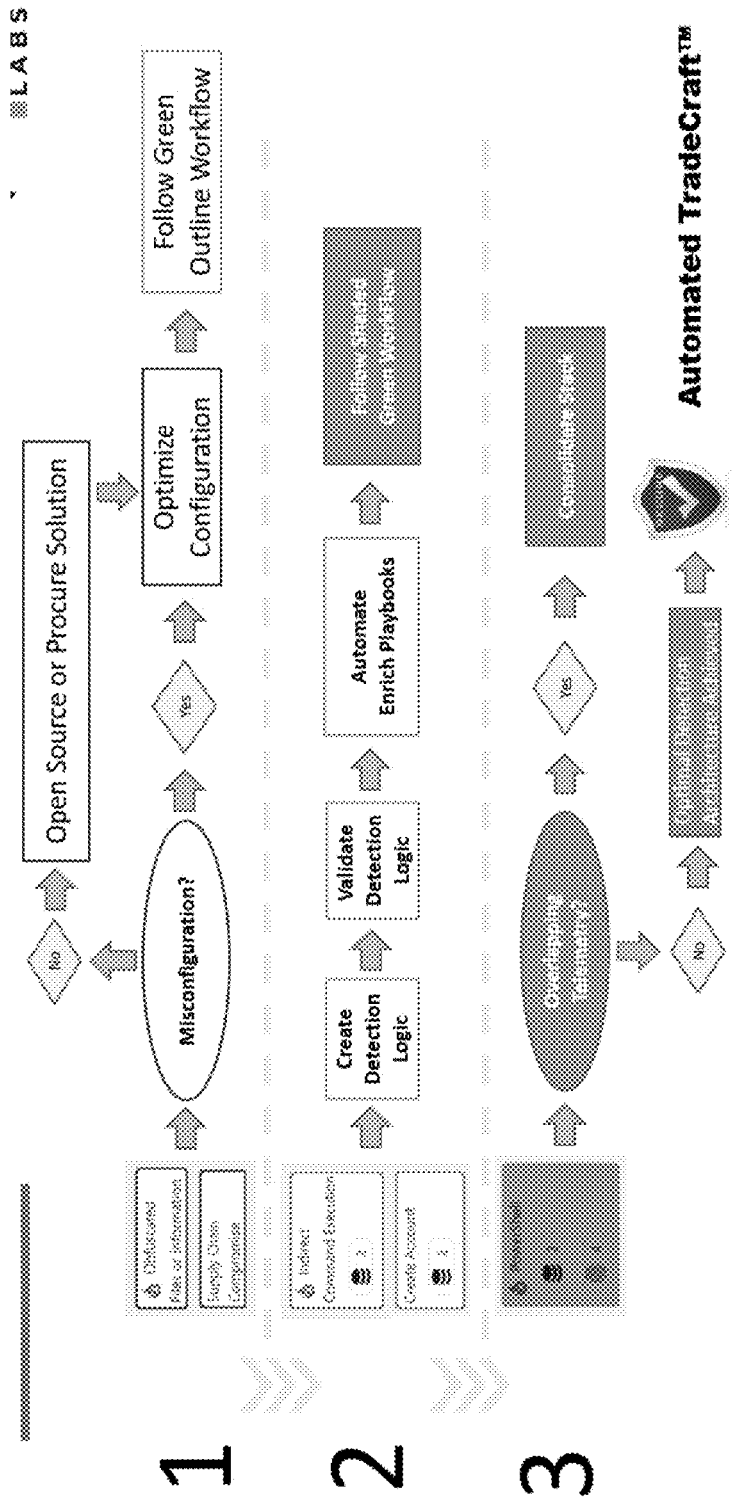
FIG. 11 shows an example methodology for automatically sensing configurations to understand adversarial-technique detection coverage, overlapping telemetry that aids in optimized storage strategies, informed cyber defense software procurement, and cyber toolset stack consolidation, and developing mitigation recommendations, according to an embodiment.

For example, FIG. 11 shows an example methodology for automatically sensing configurations and developing mitigation recommendations, according to an embodiment. As shown in the example of FIG. 11, at step 1, automatic sensing of logging operating system and security product configurations present within a network identifies two techniques that are unable to be detected within the network environment such as the telemetry and/or detections used to detect adversarial activity leveraging obfuscated files or supply chain compromise. A determination is made as to whether a misconfiguration has occurred. If not, a solution is procured or open sourced, and then the configuration is optimized to generate the telemetry (e.g., identifier, primitive, subcategory, category) used to create detection for the techniques. (See, e.g., FIG. 12, which shows a table with examples of categories, subcategories, primitives and identifiers.) If a misconfiguration has occurred, then the configuration is optimized (or improved). The process then proceeds to step 2. At step 2, now that the generated telemetry is present to detect the adversarial technique, detection logic is created (or defined) and validated through assessments, which then can be enriched via automated enrichments that will assist an analyst with rapidly responding to identified threats. The process then proceeds to step 3. At step 3, a determination is made as to whether there is overlapping telemetry data. If so, then decision device recommends more cost-efficient storage strategies to reduce overlapping telemetry storage costs. Also, at step 3, a determination is made as to whether there is overlapping detection logic. If so, the overlapping detection capability stack is consolidated as described herein above. If not, then an indication has made that the optimal detection architecture is achieved (such an indication can be provided to a user, for example, via a user interface described herein above).

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, R, Java, C++, or other programming languages (e.g., object-oriented programming languages) and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. They are presented to assist in understanding and teach the embodiments.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is an example and equivalents, regardless of order, are contemplated by the disclosure.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

It should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles 'a' and 'an,' as used herein in the specification and in the embodiments, unless clearly indicated to the contrary, should be understood to mean 'at least one.'

The phrase 'and/or,' as used herein in the specification and in the embodiments, should be understood to mean 'either or both' of the elements so conjoined, i.e., elements that are conjunctively present in some cases and disjunctively present in other cases. Multiple elements listed with 'and/or' should be construed in the same fashion, i.e., 'one or more' of the elements so conjoined. Other elements can optionally be present other than the elements specifically identified by the 'and/or' clause, whether related or unrelated to those elements specifically identified. Thus, as a non-limiting example, a reference to 'A and/or B', when used in conjunction with open-ended language such as 'comprising' can refer, in one embodiment, to A only (optionally including elements other than B); in another embodiment, to B only (optionally including elements other than A); in yet another embodiment, to both A and B (optionally including other elements); etc.

As used herein in the specification and in the embodiments, 'or' should be understood to have the same meaning as 'and/or' as defined above. For example, when separating items in a list, 'or' or 'and/or' shall be interpreted as being inclusive, i.e., the inclusion of at least one, but also including more than one, of a number or list of elements, and, optionally, additional unlisted items. Only terms clearly indicated to the contrary, such as 'only one of' or 'exactly one of,' or, when used in the embodiments, 'consisting of,' will refer to the inclusion of exactly one element of a number or list of elements. In general, the term 'or' as used herein shall only be interpreted as indicating exclusive alternatives (i.e. 'one or the other but not both') when preceded by terms of exclusivity, such as 'either,' 'one of,' 'only one of,' or 'exactly one of.' 'Consisting essentially of,' when used in the embodiments, shall have its ordinary meaning as used in the field of patent law.

As used herein in the specification and in the embodiments, the phrase 'at least one,' in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase 'at least one' refers, whether related or unrelated to those elements specifically identified. Thus, as a non-limiting example, 'at least one of A and B' (or, equivalently, 'at least one of A or B,' or, equivalently 'at least one of A and/or B') can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as 'comprising,' 'including,' 'carrying,' 'having,' 'containing,' 'involving,' 'holding,' 'composed of,' and the like are to be understood to be open-ended, i.e., to mean including but not limited to. Only the transitional phrases 'consisting of' and 'consisting essentially of' shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes can be made without departing from the scope of the disclosure.

What is claimed is:

1. A method, comprising:
    identifying detection coverage of a set of adversarial techniques based on telemetry data and a detection instance of an environment;
    determining a subset of detection coverage having a metric value below a metric value threshold and among the detection coverage for the set of adversarial techniques;
    identifying at least one detection instance associated with the subset of detection coverage for the set of adversarial techniques;
    presenting, via a graphical user interface, a representation of at least one of the subset of detection coverage or the at least one detection instance associated with the subset of detection coverage;
    updating the subset of detection coverage based on at least the telemetry data, the detection instance, or the at least one detection instance associated with the subset of detection coverage to improve the metric value of the subset of detection coverage to above the metric value threshold;
    generating historical telemetry data, historical adversarial techniques, and historical detection instances by storing the telemetry data, the set of adversarial techniques, and the at least one detection instance associated with the subset of detection coverage during a time interval;
    training a machine learning model based on the historical telemetry data, the historical adversarial techniques, and the historical detection instances;
    receiving (1) telemetry data not included within the historical telemetry data or (2) at least one detection instance not included within the historical detection instances; and
    executing the machine learning model based on the telemetry data or the at least one detection instance to predict an occurrence of an adversarial technique used by a cyber adversary and a confidence score for the occurrence of the adversarial technique.

2. The method of claim 1, further comprising:
    identifying telemetry data, at least a portion of the telemetry data indicative of a set of adversarial techniques in the environment; and
    determining the detection instance queryable against the telemetry data to detect the set of adversarial techniques in the environment.

3. The method of claim 2, wherein the identifying the telemetry data includes automatically sensing the telemetry data in at least one of a data lake, an intrusion detection system (IDS), an intrusion prevention system (IPS), a network appliance, or an endpoint protection platform (EPP).

4. The method of claim 2, wherein the identifying the telemetry data includes fetching the telemetry data from at least one of a firewall, an endpoint detection and response (EDR), cloud telemetry, or an anti-virus (AV) software.

5. The method of claim 1, wherein the subset of detection coverage is a first subset of detection coverage, the detection coverage includes a second subset of detection coverage, the second subset of detection coverage having a metric value above the metric value threshold.

6. The method of claim 1, wherein each adversarial technique from the set of adversarial techniques and within the detection coverage is associated with a value in a range between a maximum detection coverage value and a minimum detection coverage value.

7. The method of claim 1, wherein the determining the subset of detection coverage includes using at least one of a rule-based equation, a user choice, or a machine learning model.

8. The method of claim 1, further comprising:
    determining an overlap in the telemetry data that detect the set of adversarial techniques; and
    reducing a telemetry data storage cost based on the overlap in the telemetry data.

9. The method of claim 8, wherein the set of adversarial techniques are a first set of adversarial techniques, the method further comprising:
    identifying a second set of adversarial techniques based on the overlap in the telemetry data, the second set of adversarial techniques being different from the first set of adversarial techniques.

10. The method of claim 8, wherein the overlap in the telemetry data can be eliminated from the telemetry data without reducing the detection coverage.

11. The method of claim 8, wherein the determination of the overlap includes passively monitoring a data transmission source in a network.

12. The method of claim 8, further comprising:
receiving, before determining the overlap, telemetry data sent automatically from a telemetry sensor; and
defining a mitigation recommendation based on the subset of detection coverage having the metric value below the metric value threshold,
the presenting including presenting, to a user via the graphical user interface, the mitigation recommendation.

13. The method of claim 1, further comprising mapping the detection coverage to an adversarial technique framework, the adversarial technique framework including at least one of a National Security Agency/Central Security Service Technical Cyber Threat Framework (NTCTF), and a MITRE Adversarial Tactics, Techniques, Common Knowledge (ATT&CK®) framework, Lockheed Martin Cyber Kill Chain, and Diamond Model.

14. The method of claim 1, wherein the determination of the subset of detection coverage is based on a user choice after presenting a representation of at least one of the subset of detection coverage or the at least one detection instance associated with the subset of detection coverage.

15. The method of claim 1, further comprising:
reducing a telemetry data storage cost based on a performance of the telemetry data; and identifying detection triage inefficiencies based on a performance of detection instance.

16. The method of claim 1, wherein:
the adversarial technique is a first adversarial technique,
the executing the machine learning model includes executing the machine learning model to predict an adversary attack chain that includes the first adversarial technique and a second adversarial technique predicted to occur subsequent to the first adversarial technique,
the executing the machine learning model further includes executing the machine learning model to predict an attack chain response actions to prevent the second adversarial technique after the occurrence of the first adversarial technique and before an occurrence of the second adversarial technique.

17. An apparatus, comprising:
a memory and a processor of a first compute device, the processor operatively coupled to the memory and configured to:
receive, from a second compute device, a signal representing telemetry data and a detection instance of an environment;
identify detection coverage of a first set of adversarial techniques based on the telemetry data and the detection instance of the environment;
determine a subset of detection coverage having a metric value below a metric value threshold and among the detection coverage for the first set of adversarial techniques;
identify at least one detection instance associated with the subset of detection coverage for the first set of adversarial techniques;
present a representation of at least one of the subset of detection coverage or the at least one detection instance associated with the subset of detection coverage;
update the subset of detection coverage based on at least the telemetry data, the detection instance, or the at least one detection instance associated with the subset of detection coverage to improve the metric value of the subset of detection coverage to above the metric value threshold;
execute a machine learning model to predict an adversary attack chain that includes at least a second set of adversarial techniques predicted to occur subsequent to the first set of adversarial techniques; and
execute the machine learning model to predict an attack chain response actions to prevent the second set of adversarial techniques after an occurrence of the first set of adversarial techniques and before an occurrence of the second set of adversarial techniques.

18. The apparatus of claim 17, wherein the second compute device is configured to:
identify telemetry data, at least a portion of the telemetry data indicative of the first set of adversarial techniques in the environment;
determine a detection instance queryable against the telemetry data to detect the first set of adversarial techniques in the environment; and
send, to the first compute device, a signal representing the telemetry data and the detection instance.

19. The apparatus of claim 17, wherein the identifying the telemetry data includes automatically sensing the telemetry data in at least one of a data lake, an intrusion detection system (IDS), an intrusion prevention system (IPS), a network appliance, or an endpoint protection platform (EPP).

20. The apparatus of claim 17, wherein the identifying the telemetry data includes fetching telemetry data from a firewall, an endpoint detection and response (EDR), cloud telemetry, or an anti-virus (AV) software.

21. A non-transitory processor-readable medium storing code representing instructions to be executed by a processor, the code comprising code to cause the processor to:
receive (1) historical telemetry data used to detect a set of historical adversarial techniques in a set of environments, (2) historical detection instances queried against the historical telemetry data to detect the historical set of adversarial techniques in the set of environments, and (3) the historical set of adversarial techniques;
train a machine learning model based on the historical telemetry data, the historical adversarial techniques, and the historical detection instances, to produce a trained machine learning model;
receive, from an environment, (1) telemetry data not included within the historical telemetry data or (2) at least one detection instance not included within the historical detection instances; and
execute the trained machine learning model based on the telemetry data and the at least one detection instance to predict an occurrence of an adversarial technique used by a cyber adversary and a confidence score for the occurrence of the adversarial technique.

22. The non-transitory processor-readable memory of claim 21, wherein:
the adversarial technique is a first adversarial technique,
the code to execute the machine learning model includes code to execute the machine learning model to predict an adversary attack chain that includes the first adversarial technique and a second adversarial technique that is predicted to occur subsequent to the first adversarial technique, and
the code to execute the machine learning model further includes code to execute the machine learning model to predict an attack chain response action to prevent the second adversarial technique after the occurrence of the first adversarial technique and before an occurrence of the second adversarial technique.

* * * * *